(12) United States Patent
Yeh et al.

(10) Patent No.: US 8,452,140 B2
(45) Date of Patent: May 28, 2013

(54) OPTICAL SOCKET ASSEMBLY HAVING OPTICAL SOCKET WITH ELECTRICAL RESILENT CONTACTS

(75) Inventors: Cheng-Chi Yeh, Tu-Cheng (TW); Andrew Cheng, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 367 days.

(21) Appl. No.: 12/882,204

(22) Filed: Sep. 15, 2010

(65) Prior Publication Data

US 2012/0063728 A1   Mar. 15, 2012

(51) Int. Cl.
*G02B 6/32* (2006.01)
*G02B 6/00* (2006.01)

(52) U.S. Cl.
USPC ............................................ 385/33; 385/147

(58) Field of Classification Search
USPC ............ 385/33–41, 8, 14, 88–98, 147
See application file for complete search history.

(56) References Cited

U.S. PATENT DOCUMENTS

| | | | |
|---|---|---|---|
| 4,118,105 A * | 10/1978 | Voigt | 385/88 |
| 4,695,120 A * | 9/1987 | Holder | 385/14 |
| 6,869,231 B2 * | 3/2005 | Chiu et al. | 385/93 |
| 6,910,812 B2 * | 6/2005 | Pommer et al. | 385/92 |
| 7,373,033 B2 * | 5/2008 | Lu et al. | 385/14 |
| 7,539,376 B2 * | 5/2009 | Bozso et al. | 385/33 |

* cited by examiner

*Primary Examiner* — Akm Enayet Ullah
(74) *Attorney, Agent, or Firm* — Wei Te Chung; Ming Chieh Chang

(57) ABSTRACT

An socket assembly (100) comprises an optical socket (1) and an IC package (5) assembled to the optical socket (1), the optical socket (1) comprises an insulative housing (4) with a plurality of passageways (4110), a plurality of optic members (3) received in the passageways (4110) and a plurality of electrical contacts (2) received in the insulative housing (1). The optic member (3) comprises a waveguide (31) and a lens (32) at the end of the waveguide (31), the IC package (5) comprises a plurality of lenses (510) located at the bottom portion (51) thereof and a plurality of electrical conducts (512) located at peripheral thereof, the lens (510) are received in the passageway (4110) and the electrical conducts (512) connect with the electrical contacts (2).

16 Claims, 6 Drawing Sheets

OPTICAL SOCKET ASSEMBLY HAVING OPTICAL SOCKET WITH ELECTRICAL RESILENT CONTACTS

BACKGROUND OF THE INVENTION

1. Field of the Invention

The present invention relates to an optical socket, and more particularly to an optical socket for transmitting optical signal and electrical power simultaneously.

2. Description of the Prior Art

A conventional electrical connector for electrically connecting an IC package to a printed circuit board comprises an insulative housing and a plurality of contacts received therein to transmit signal and electrical current. The insulative housing comprises a bottom wall and sidewalls extending upwardly from the bottom wall. The bottom wall comprises a top surface and a bottom surface opposite to the top surface. The contacts are made of metal and each comprises a body portion, a contact portion extending beyond the top surface and a tail extending beyond the bottom surface. The body portion is positioned in the bottom wall to secure the contact in the insulative housing. The contact portion is used to contact with the pad of the IC package and the tail is used to contact with the pad of the printed circuit board. Thus, a good electrical connection is established between the IC package and the printed circuit board to transmit signal and electrical current.

The electrical connector becomes smaller and smaller and the number of the contacts becomes more and more. Thus, the heat produced by the electrical connector becomes more and more. The same time, the distance between the contacts becomes smaller and smaller, thus the electromagnetic interference becomes more and more serious. Another problem is the IC package presses the contact portion of the contact to touch the contact, if the contact portions are not in a same height, part of the contacts will not touch the IC package. The electrical connector will not function normally.

Therefore, it is needed to find a new socket assembly to overcome the problems mentioned above.

SUMMARY OF THE INVENTION

Accordingly, an object of the present invention is to provide an optical socket for transmitting optical signal and electrical power.

In order to achieve the object set forth, an socket assembly comprises an optical socket and an IC package assembled to the optical socket, the optical socket comprises an insulative housing with a plurality of passageways, a plurality of optic members received in the passageways and a plurality of electrical contacts received in the insulative housing. The optic member comprises a waveguide and a lens at the end of the waveguide, the IC package comprises a plurality of lenses located at the bottom portion thereof and a plurality of electrical conducts located at peripheral thereof, the lens are received in the passageway and the electrical conducts connect with the electrical contacts.

DESCRIPTION OF PREFERRED EMBODIMENT

Reference will now be made to the drawings to describe the present invention in detail.

Figure 1:
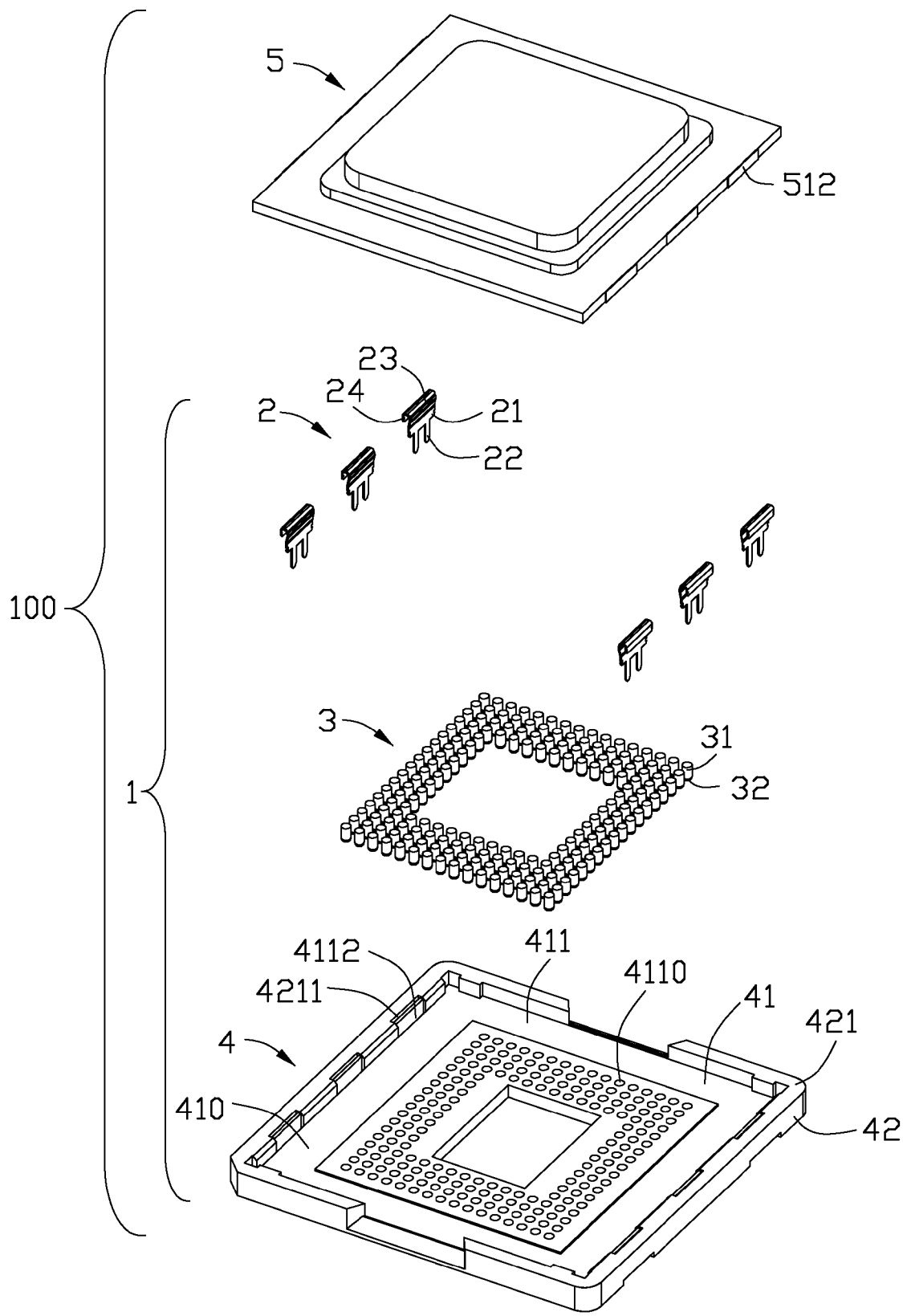
FIG. 1 is an exploded view of the socket assembly according to a preferred embodiment of the present invention.
Figure 4:
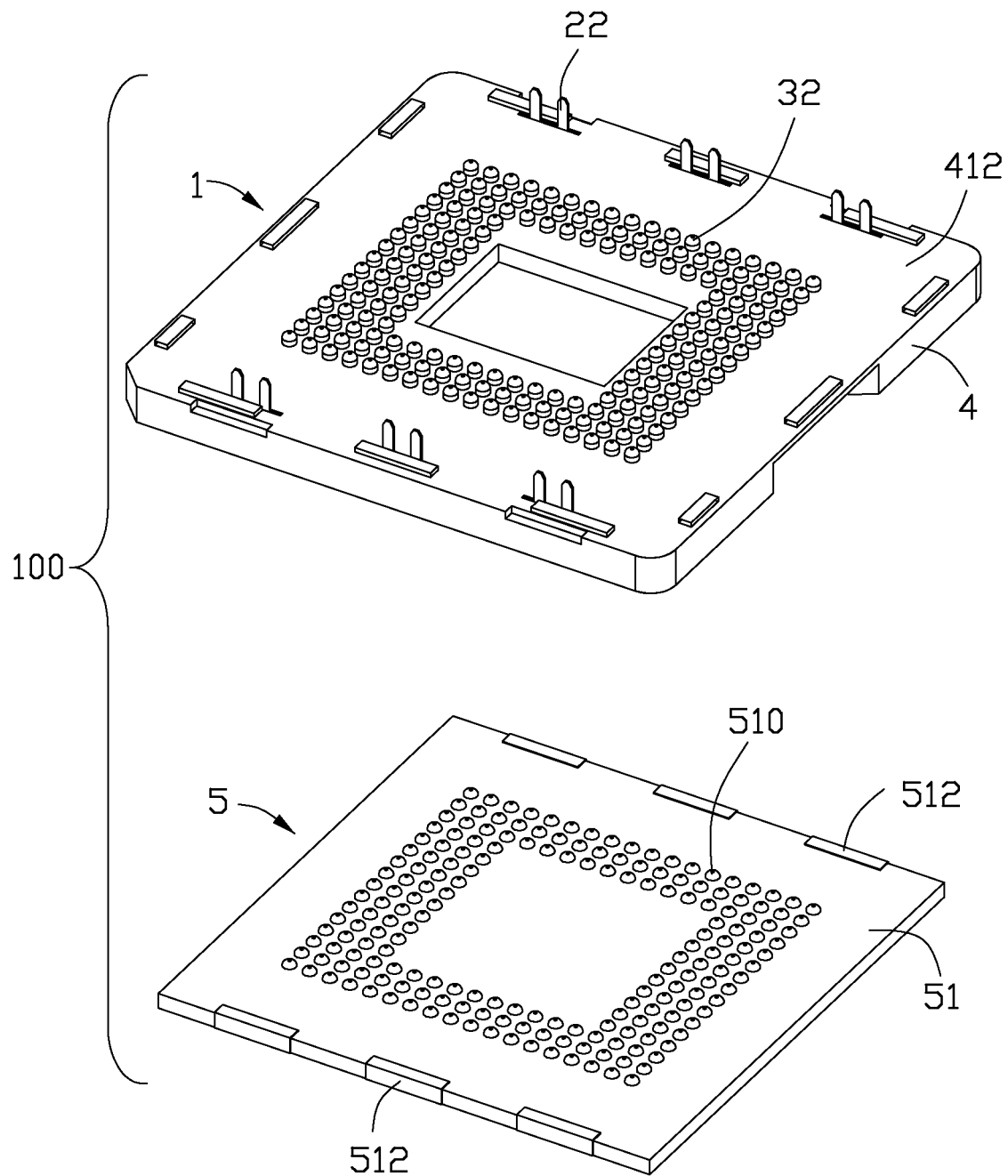
FIG. 4 is a bottom view of the socket assembly shown in FIG. 3.
Figure 5:
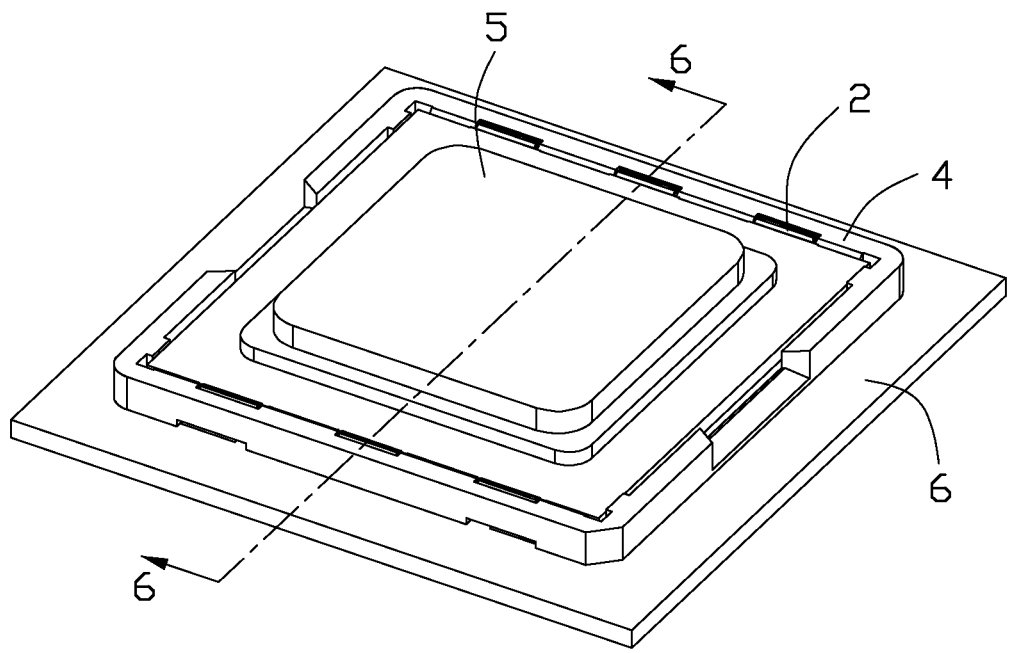
FIG. 5 is an assembled view of the socket assembly shown in FIG. 1, shown the socket assembly assembled to a printed circuit board.
Figure 6:
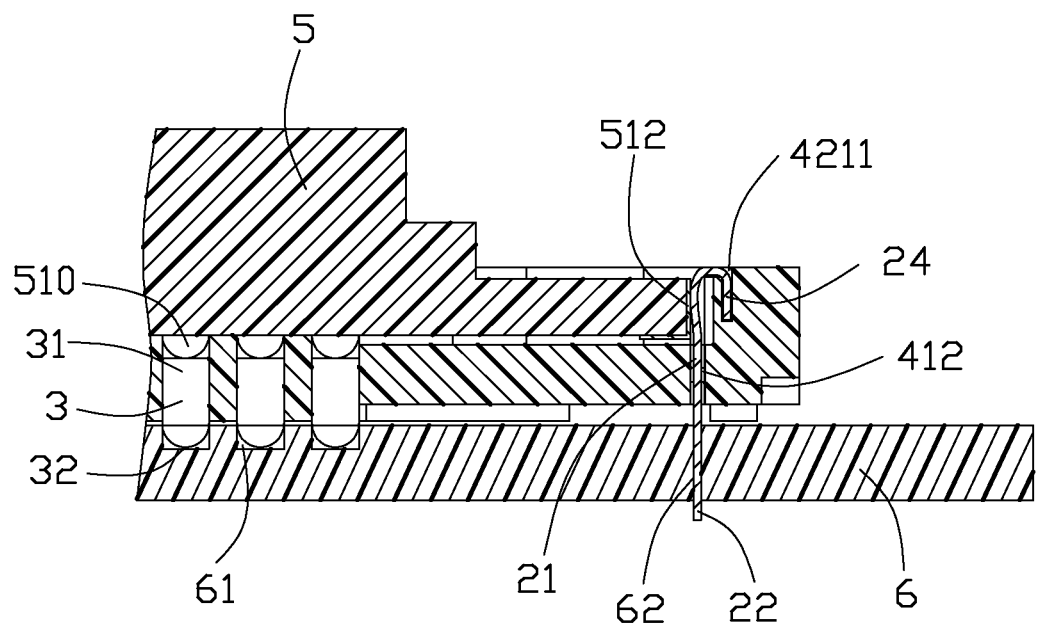
FIG. 6 is a partial cross-sectional view of the socket assembly taken along line 6-6 in FIG. 5.

Referring to FIG. 1 and FIG. 4, the socket assembly 100 comprises an IC package 5 and an optical socket 1. The optical socket 1 is used to connecting the IC package 5 to a printed circuit board 6. The optical socket 1 comprises an insulative housing 4, a plurality of optical members 3 to transmit optical signal and a plurality of electrical contacts 2 to transmit electrical power.

Figure 2:
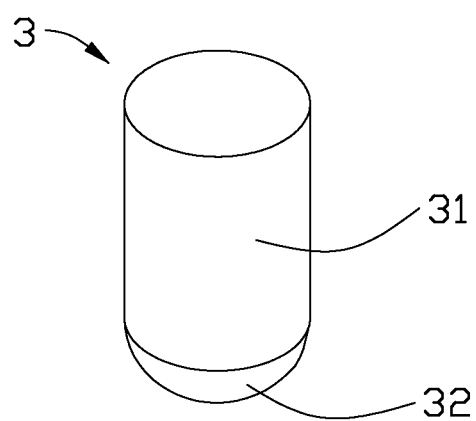
FIG. 2 is an isometric view of the optic member shown in FIG. 1.
Figure 3:
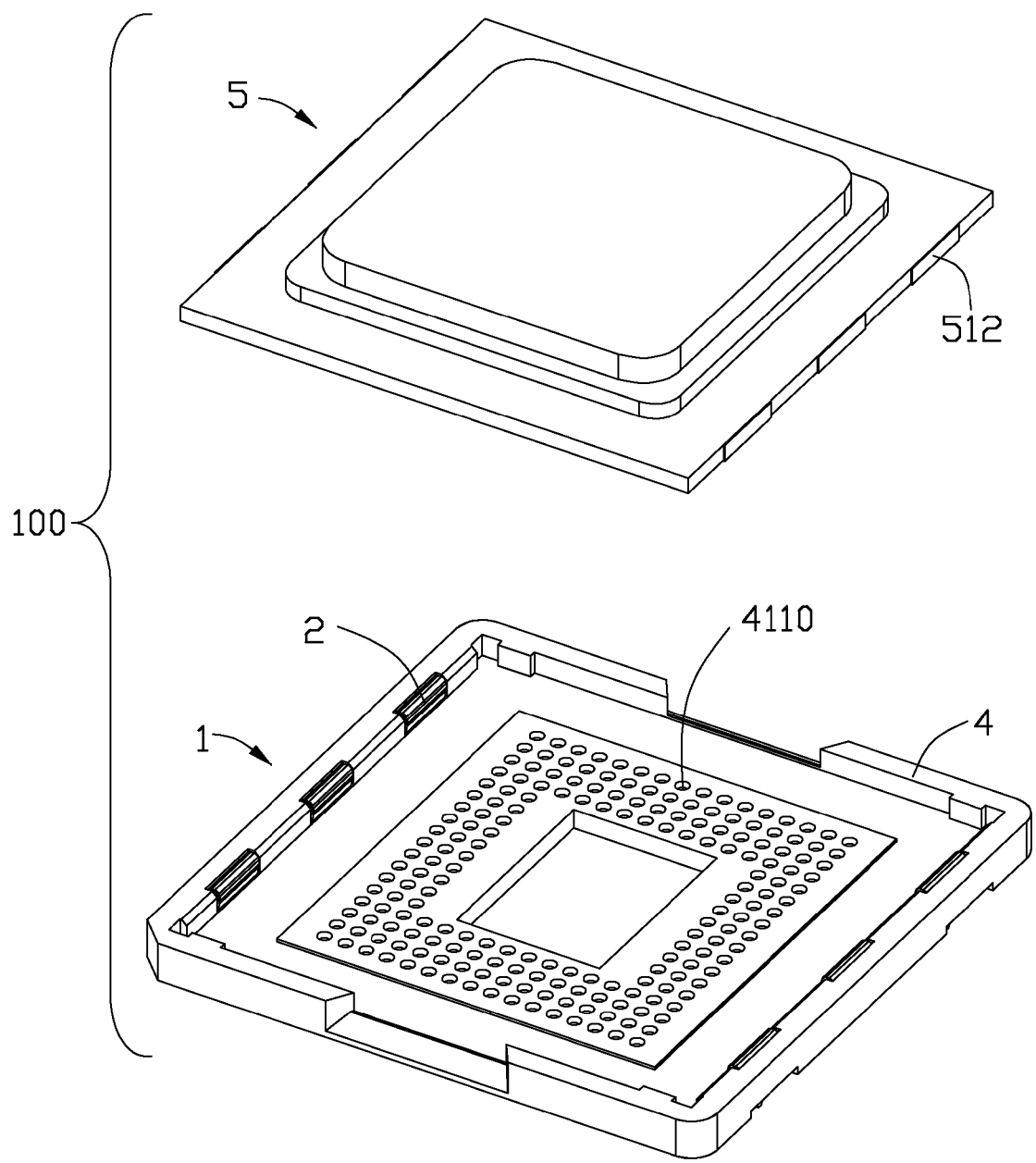
FIG. 3 is an assembled view of the socket assembly shown in FIG. 1, shown an IC package not assembled to the optical socket.

Referring to FIG. 1 and FIG. 3, the insulative housing 4 comprises a bottom wall 41 and four sidewalls 42 extending upwardly from the bottom wall 41 whereby form a receiving space 410 for receiving the IC package 5. The bottom wall 41 comprises a top surface 411, a bottom surface 412 opposite to the top surface 411, a plurality of passageways 4110 and a plurality of channels 4112 impenetrate the top surface 411 and the bottom surface 412. The channels 4112 are adjacent to the sidewalls 412 of the insulative housing 4 and located at peripheral of the passageways 4110. The sidewall 42 comprises an upper surface 421 and a plurality of recesses 421 depressed from the upper surface 421 to the inner of the sidewall 42. The IC package 5 comprises a plurality of lenses 510 located on the bottom portion 51 and a plurality of electrical conducts 512 located on opposite sides thereof Referring to FIGS. 1-2, the electrical contacts 2 each comprises a body portion 21, a contact portion 23 extends upwardly from the body portion 21, a head portion 24 extends curvedly and downwardly from the contact portion 23 and a tail 22 extends downwardly from the body portion 21. The optical member 3 comprises a waveguide 31 with column shape and a lens 32 at bottom end of the waveguide 31. The waveguide 31 is made of material that can transmit light such as glass et al.

Referring to FIGS. 2-5, shown the socket assembly 100 is assembled. The optical members 3 are received in the passageways 4110 of the insulative housing 4 to transmit optical signal. The waveguide 31 is received in the passageway 4110 and the lens 32 is located beyond the bottom surface 412 of the insulative housing 4. The upper of the waveguide 31 is lower than the top surface 411 of the insulative housing 4. The electrical contacts 2 are received in the channels 4112 of the insulative housing 4 to transmit electrical power, the body portion 21 is received in the channel 4112, the contact portion 23 is located beyond the top surface 411, the tail 22 is located beyond the bottom surface 412, and the head portion 24 is received in the recess 4211.

The IC package 5 is received in the receiving space 410 of the insulative housing 4. The lenses 510 are received in the passageways 4110 respectively, the electrical conducts 512 connect with the contact portion 23 of the electrical contacts 2 in the horizontal direction. The lens 32 of the optical member 3 is received in the hollow 61 of the printed circuit board 6 and the rear end 22 of the electrical contact 2 is received in the hole 62 of the printed circuit board 6. The rear end 22 of the electrical contact 2 received in the hole 62 of the printed circuit board 6 also can secure the optical socket 1 on the printed circuit board 6.

Although the present invention has been described with reference to particular embodiments, it is not to be construed as being limited thereto. Various alterations and modifications can be made to the embodiments without in any way departing from the scope or spirit of the present invention as defined in the appended claims.

What is claimed is:

1. An socket assembly, comprising:
   an optical socket comprising an insulative housing with a plurality of passageways, a plurality of optic members received in the passageways and a plurality of electrical contacts attached to the insulative housing, the optic members each comprising a waveguide and a lens at bottom end thereof; and
   an IC package comprising a bottom portion and a side surface perpendicular with the bottom portion, the IC package also comprising a plurality of lenses located at the bottom portion and a plurality of electrical conducts located at the side surface, the lens being received in the passageway and the electrical conducts sidewardly contacting with the electrical contacts.

2. The socket assembly as claimed in claim 1, wherein the electrical contact comprises a body portion located in the insulative housing, a contact portion extending from the body portion to contact with the electrical conduct of the IC package and a tail extending from the body portion, wherein the tail is located beyond the insulative housing.

3. The socket assembly as claimed in claim 2, wherein the electrical contact also comprises a head portion extending downwardly from the contact portion.

4. The socket assembly as claimed in claim 3, wherein the insulative housing comprises a bottom wall and a plurality of sidewalls extending upwardly from the bottom wall.

5. The socket assembly as claimed in claim 4, wherein the head portion is positioned the sidewall.

6. The socket assembly as claimed in claim 5, wherein the sidewall comprises an upper surface and a recess depressed from the upper surface to the inner of the insulative housing, the head portion is located in the recess.

7. An optical socket for connecting an IC package to a printed circuit board, comprising:
   an insulative housing comprising a bottom wall and a side wall extending upwardly from the bottom wall;
   a plurality of optic members received in the bottom wall and each comprising a waveguide and a lens at bottom end of the waveguide; and
   a plurality of electrical contacts located on periphery of the insulative housing and comprising a body portion located in the insulative housing, a tail extending downwardly from the body portion and a contact portion extending upwardly along the side wall from the body portion; wherein
   the bottom wall comprises a top surface, a bottom surface opposite to the top surface, the top end of the waveguide is lower than the top surface of the insulative housing, the lens of the optic member is located beyond the bottom surface of the insulative housing.

8. The optical socket as claimed in claim 7, wherein the electrical contact also comprises a head portion extending downwardly from the contact portion.

9. The optical socket as claimed in claim 8, wherein the insulative housing comprises a bottom wall and a plurality of sidewalls extending from the bottom wall whereby forms a receiving space, and wherein the contact portion of the electrical contact extends into the receiving space.

10. An optical socket assembly for use with an IC (Integrated Circuit) package, comprising:
    a housing defining an upward receiving space surrounded by a bottom wall and a periphery wall for circumferentially receiving said IC package therein;
    a plurality of optical members disposed in the bottom wall and arranged in matrix for confrontation with downwardly facing lenses of the IC package in a vertical direction;
    a plurality of electrical contacts dispersed on an interior face of said periphery wall for electrically connection with side terminals of the IC package via confrontation therebetween in a lateral direction perpendicular to said vertical direction: wherein
    said bottom wall defines a plurality of passageways each receiving not only the corresponding optical member but also the downwardly facing lens of the IC package.

11. The optical socket assembly as claimed in claim 10, further including a printed circuit board having an optical reception area upwardly confronting the optical members and an electrical reception area confronting the contacts which extend downwardly beyond a bottom face of the housing.

12. The optical socket assembly as claimed in claim 11, wherein said printed circuit board includes a plurality of recesses receiving corresponding optical members, respectively.

13. The optical socket assembly as claimed in claim 10, wherein said housing and said contacts are configured to allow said contacts to be only downwardly assembled to the housing.

14. The optical socket as claimed in claim 7, wherein an upper end portion of the lens does not project beyond an upper surface of the side wall.

15. The optical socket assembly as claimed in claim 13, wherein each of said contacts defines an upside-down U-shaped structure seated upon a top surface of the periphery wall.

16. The optical socket assembly as claimed in claim 10, wherein said periphery wall defines a rectangular configuration with two pairs of sides, and the contacts are located on one pair of said two pairs of sides while the other pair of said two pairs are equipped with notches for easy grasping of the IC package during loading/unloading.

* * * * *